United States Patent [19]

Rhee

[11] 3,710,171

[45] Jan. 9, 1973

[54] CURRENT DRIVE DEFLECTION APPARATUS UTILIZING CONSTANT CURRENT GENERATOR

[75] Inventor: Dong Woo Rhee, Williamsville, N.Y. 14221

[73] Assignee: GTE Sylvania Inc.

[22] Filed: June 8, 1970

[21] Appl. No.: 44,476

[52] U.S. Cl. ..........................315/27 TD, 315/27 GD

[51] Int. Cl. ..............................................H01j 29/70

[58] Field of Search.......315/27 TD, 27 R, 29, 28, 22

[56] References Cited

UNITED STATES PATENTS

| | | | |
|---|---|---|---|
| 3,109,122 | 10/1963 | Cornell et al | 315/27 TD |
| 3,543,080 | 11/1970 | Wuensch | 315/27 GD |
| 3,155,873 | 11/1964 | Paschal | 315/27 TD |
| 3,543,081 | 11/1970 | Vitek | 315/29 |

*Primary Examiner*—Carl D. Quarforth
*Assistant Examiner*—J. M. Potenza
*Attorney*—Norman J. O'Malley, Robert E. Walrath and Thomas H. Buffton

[57] ABSTRACT

Current drive deflection apparatus for providing a current to a beam deflection winding of a cathode ray tube is shown. The current drive deflection apparatus employs a constant current generator and a current control means which provide a sawtooth current to the winding. Current drive deflection apparatus which employs a complementary current amplifier is also shown.

17 Claims, 12 Drawing Figures

INVENTOR.
DONG W. RHEE

BY Robert C. Walrath
ATTORNEY

INVENTOR.
DONG W. RHEE
BY Robert E. Walrath
ATTORNEY

INVENTOR.
DONG W. RHEE
BY Robert E. Walrath
ATTORNEY

CURRENT DRIVE DEFLECTION APPARATUS UTILIZING CONSTANT CURRENT GENERATOR

BACKGROUND OF THE INVENTION

In prior art cathode ray tube deflection systems such as those used in the display apparatus of television receivers, the horizontal and vertical deflection or sweep rates are determined by the horizontal and vertical oscillator frequencies which are synchronized to the incoming signal. The outputs of the oscillators are applied to power stages and waveshaping circuitry. Ordinarily the power stages are transformer coupled to the deflection windings.

The electron beam in the cathode ray tube is deflected by the magnetic field associated with the deflection winding which is a function of the current flowing through the deflection winding. In television receivers it is desired to provide an approximately linear sweep across the screen of the cathode ray tube and accordingly a linear sweep or sawtooth deflection current is applied to the deflection winding. Deflection windings, however, have a resistance (DC impedance) as well as an inductance, and especially in the case of a low impedance winding such as the vertical deflection winding used in typical television receivers, this resistance is critical because it is a large portion of the total winding impedance. To compensate for the winding resistance a complex voltage waveform must be generated to drive the deflection winding with a sawtooth current. Suitable waveform generators for generating such waveforms are also complex. Furthermore, the resistance of the deflection winding varies due to factors such as temperature changes among others. The temperature sensitivity of the winding is further compounded because the heat which causes the resistance change is at least in part caused by the winding resistance so that there is a regenerative effect. Therefore, temperature compensation for the deflection winding is required to provide a continuously linear current through the winding. Thermistors have been used for such temperature compensation in the prior art, however, the thermistor has to perfectly track the resistance variation of the deflection winding, and it is very difficult to match the variations of the thermistor resistance and deflection winding resistance. Also, a linearity control is required to compensate for variations in deflection winding impedance due to production variables.

In prior art systems wherein transformers are used, the transformers present additional problems, such as size and stray magnetic fields. Since considerable power must be provided by the transformer, it becomes large and expensive. Various attempts have been made to eliminate the transformer, especially in the vertical deflection apparatus, but such attempts have suffered from various problems. For example, Class B push-pull amplifiers have been proposed. Such amplifiers and other transformerless circuits also require a linearity control and temperature compensation because they are voltage drive circuits. In addition they require complex waveshaping and drive circuitry to apply the proper voltage waveform to the deflection winding. Also, a coupling capacitor is required to couple the drive circuitry to the deflection winding, and in a typical transformerless voltage drive system this coupling capacitor becomes very large. For example, for a very low impedance vertical deflection winding (1.6 mh and 4 ohms) the required coupling capacitor may be as large as 16,000 microfarads or larger. Such very large capacitors are cumbersome and expensive; they may be as large physically and as expensive as the transformer they replace. Accordingly, prior attempts to eliminate the transformer in deflection apparatus have been unsuccessful because of the several disadvantages mentioned above and for many other reasons.

OBJECTS AND SUMMARY OF THE INVENTION

It is an object of this invention to obviate the disadvantages of the prior art.

It is a further object to provide a transformerless deflection apparatus for cathode ray tubes.

It is a further object to provide current drive deflection apparatus for cathode ray tubes.

In one aspect of this invention the above objects are achieved in apparatus for deflecting an electron beam in a cathode ray tube wherein a means for providing a constant current and a current control means are connected to a deflection winding wherein a current is provided to the deflection winding in response to the current flowing through the current control means and the constant current from the means for providing a constant current. Means are connected to the current control means for varying its conduction to apply a current of a predetermined waveform to the deflection winding.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above-described drawings.

While this invention will be described with reference to the vertical deflection of an electron beam in a television receiver, it is to be understood that use of the invention in deflection apparatus other than the specific example will be evident to those skilled in the art.

Figure 1:
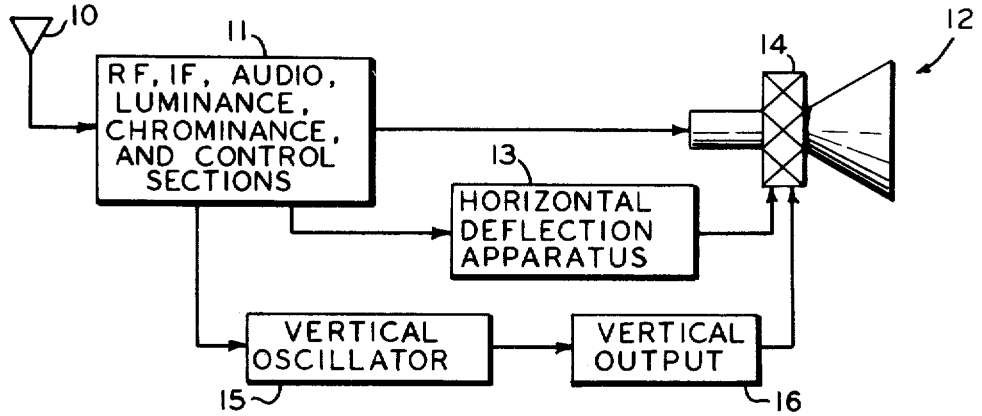
FIG. 1 is a block diagram of a television receiver in which the invention can be utilized.

FIGS. 1 and 2

In FIG. 1 an antenna 10 is connected to a block 11 which includes the usual RF, IF, audio, luminance, chrominance, and control section of a color television receiver. In a monochrome receiver block 11 would contain similar components with the exception of the chrominance section. An output from block 11 is connected to a cathode ray tube 12 which serves to generate a visual display on the screen thereof from the signals applied thereto. Separated synchronizing pulses are coupled from block 11 to the horizontal deflection apparatus 13 which provides a horizontal deflection current to the horizontal deflection winding in deflection yoke 14 positioned about cathode ray tube 12. Other separated synchronizing pulses are coupled to a vertical oscillator 15 to synchronize oscillator 15 to the received composite television signal. The output signal from oscillator 15 is coupled to a vertical output stage 16 which includes waveform generators or shapers and drivers to apply a suitable vertical deflection current to a vertical deflection winding in yoke 14.

Figure 2A:
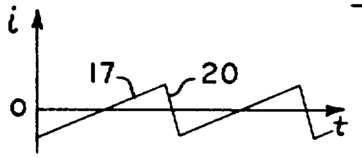
FIGS. 2A, 2B, and 2C are current and voltage waveforms of the type applied to the vertical deflection winding.
Figure 2B:
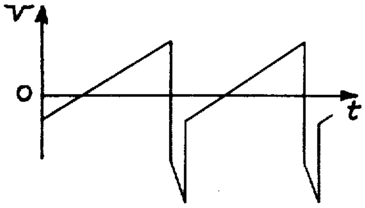
Figure 2C:
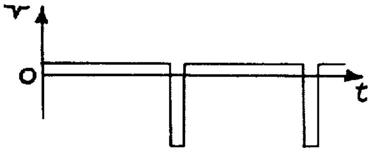

To obtain a linear vertical sweep, the vertical deflection winding is driven by a bidirectional current with a sawtooth waveform illustrated in FIG. 2A. The sweep or trace portion 17 causes the electron beam in cathode ray tube 12 to scan from the top to the bottom of the screen; and the retrace portion 20 causes the electron beam to return to the top of the screen. The voltage waveform which must be generated in prior art voltage drive deflection systems to provide this current is illustrated in FIG. 2B. If the vertical deflection winding were a pure inductance, the waveform illustrated in FIG. 2C would provide a linear sweep or sawtooth current waveform. Since the vertical deflection winding has both inductance and resistance, however, the waveform illustrated in FIG. 2B must be provided to yield a suitable sawtooth current. This waveform requires complex waveshaping circuitry and is relatively difficult to control.

Figure 3:
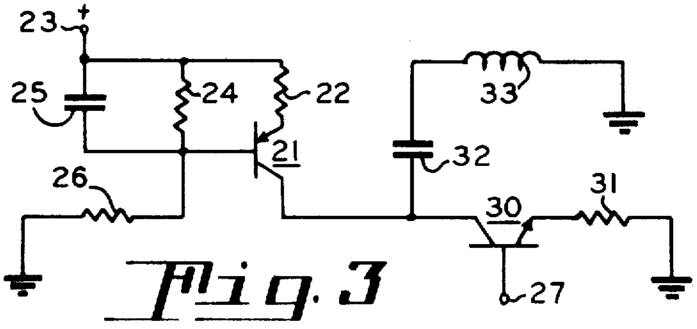
FIG. 3 is a schematic diagram of one embodiment of the invention.

FIGS. 3 and 4

In FIG. 3 a transistor means illustrated as a PNP transistor 21 is biased to provide a constant current. An input means or emitter of transistor 21 is connected by a resistor 22 to a source of energizing potential illustrated as a positive terminal 23. An input means or base of transistor 21 is connected by a resistor 24 in parallel with capacitor 25 to source 23 and by a resistor 26 to a reference potential illustrated as ground. Resistors 22, 24, and 26 establish a fixed bias at the base and emitter of transistor 21 so that a constant current is provided at an output means or collector thereof. Resistors 24 and 26 operate as a resistor divider to establish a point of reference potential at the base of transistor 21.

An input terminal 27 is connected to an input means or base of a transistor means illustrated as an NPN transistor 30. Transistor 30 has a common means or emitter connected by a resistor 31 to a common conductor illustrated as ground. Transistor 30 is connected as a current control means for controlling the current at an output means or collector thereof. The collectors of transistors 21 and 30 are connected by a coupling capacitor 32 to one end of a deflection winding 33 which can be the vertical deflection winding of yoke 14 of FIG. 1.

Figure 4A:
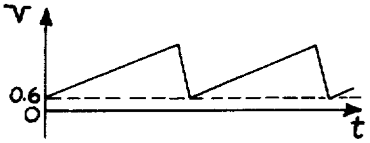
FIGS. 4A, 4B, and 4C are waveforms to aid in explaining FIG. 3.

To provide a predetermined current waveform to deflection winding 33, a complementary voltage is applied by a waveform generator to input terminal 27. The voltage applied at input terminal 27 varies the conduction of transistor 30 to correspondingly vary the current that flows through winding 33. When an input signal with a sawtooth voltage waveform such as is illustrated in FIG. 4A is applied at terminal 27, the current through transistor 30 will also have a sawtooth waveform. Since the current from transistor 21 is constant, the current through winding 33 will be of a sawtooth waveform also.

For convenience, assume that the constant current provided by transistor 21 is a typical value such as one ampere and a sawtooth signal such as is illustrated in FIG. 4A is applied to the base of transistor 30 to control the current flow therethrough. When the base voltage of transistor 30 is at a minimum, zero current flows through transistor 30 and the difference current between transistors 21 and 30 flows through winding 33 to ground, at which time the electron beam of the cathode ray tube is fully deflected in one direction. As the base voltage of transistor 30 increases from the minimum voltage, the current therethrough also increases so that less current flows through winding 33 to ground. The current through transistor 30 increases until one ampere is flowing therethrough at which time the difference current between transistor 21 and 30 is zero, providing no current through winding 33, and the electron beam of the cathode ray tube is at approximately the central portion of the screen. As the base voltage of transistor 30 increases still further, the difference current between transistors 21 and 30 flows through winding 33 and transistor 30 to ground. The current through transistor 30 increases until two amperes are flowing therethrough when the input voltage is at its maximum amplitude. At this time one ampere of the difference current between transistors 21 and 30 flows through winding 33 to transistor 30 and then to ground, and the electron beam of the cathode ray tube is fully deflected in the opposite direction.

After the voltage at the base of transistor 30 reaches its maximum amplitude, it starts to fall rapidly to decrease the conduction of transistor 30 until zero current flows therethrough. As the conduction of transistor 30 decreases, the current through winding 33 increases from a negative one ampere to a positive one ampere to cause the electron beam in the cathode ray tube to retrace.

Figure 4B:
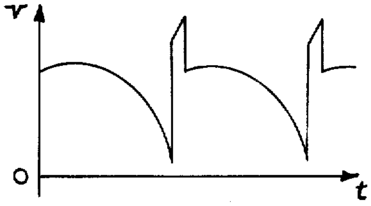
Figure 4C:
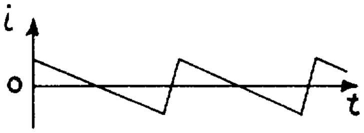

The current waveform for the current flowing through winding 33 is illustrated in FIG. 4C while the voltage at the collectors of transistors 21 and 30 is illustrated in FIG. 4B. Note that the waveform of FIG. 4B is similar to FIG. 2B. The difference is due to the voltage developed across coupling capacitor 32. In the voltage drive mode, the coupling capacitor must be large enough so that the impedance thereof will not significantly affect or distort the driving voltage. In the current drive mode, however, the impedance of capacitor 32 can be much higher, thereby permitting the use of a much smaller coupling capacitor. A smaller coupling capacitor can be used because the difference current provided by transistors 21 and 30 is relatively constant over large variations of load impedance so that the larger impedance of capacitor 32 does not deleteriously affect the current through winding 33. Since a smaller capacitor is used, the collector voltage of transistors 21 and 30 is distorted somewhat by the volt drop across capacitor 32. The voltage across winding 33, however, has the same general waveform as in FIG. 2B except that the waveform is inverted because the current is flowing in the opposite direction.

FIG. 5

Figures 5, 6:
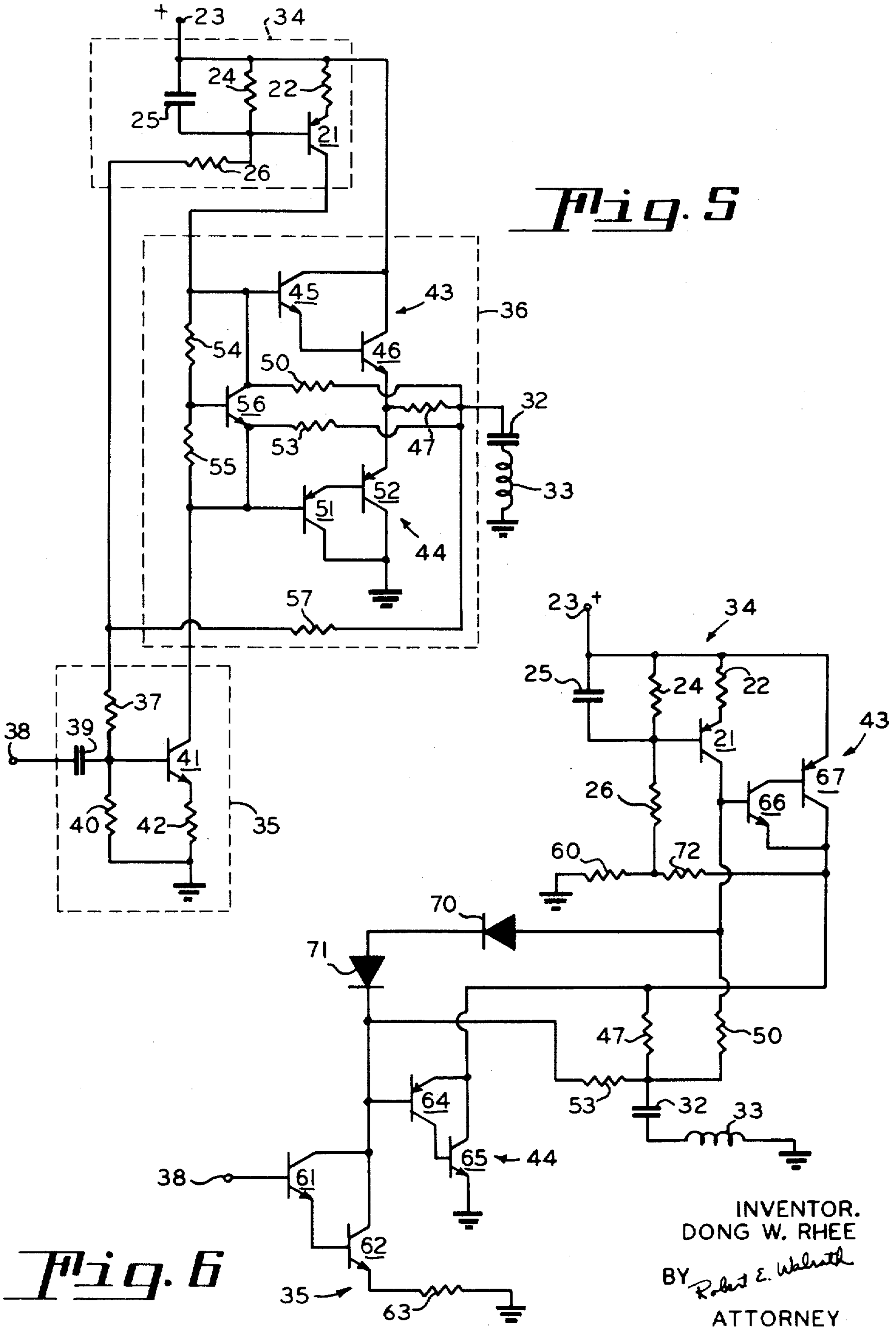
FIG. 5 is a schematic diagram of another embodiment of the invention utilizing a complementary current amplifier.
FIG. 6 is a schematic diagram of a further embodiment of the invention with a quasi-complementary current amplifier.

The embodiment of the invention illustrated in FIG. 5 utilizes a current amplifier to improve the efficiency of the current drive circuitry. A means for providing a constant current 34 and a current control means 35 are connected by a current amplifier means 36 to capacitor 32 and deflection winding 33.

Since constant current generator 34 is essentially the same structurally as the constant current generator in FIG. 3, like components are numbered the same. Although the same numbers for various components are used in the several figures, it is to be understood that the size of the components may be different in the different circuits although the functions performed by the components will be the same. Resistor 26 is connected in series with bias resistors 37 and 40 to a common conductor illustrated as ground instead of being connected directly to a reference potential as in FIG. 3. The junction between resistors 37 and 40 is connected to a control or input means such as a base of a current control means or transistor means such as an NPN transistor 41. Transistor 41 has a common means or emitter connected by a resistor 42 to a common conductor. An input means or terminal 38 is connected by a coupling capacitor 39 to the base of transistor 41. Resistors 24, 26, 37, and 40 maintain relatively fixed biases at the bases of transistors 21 and 41.

Current amplifier means 36 includes a first amplifier 43 and a second amplifier 44. Amplifier 43 includes a first transistor means such as NPN transistor 45 and a second transistor means such as NPN transistor 46. A common means such as the collectors of transistors 45 and 46 is connected to potential source 23. The collector of transistor 21, which comprises the output means of constant current generator 34, is connected to an input means of amplifier 43 such as an input means or base of transistor 45. An output means such as the emitter of transistor 45 is connected to an input means such as the base of transistor 46. An output means such as the emitter of transistor 46 is connected by a resistor 47 to capacitor 32. A resistor 50 is connected from the junction between resistor 47 and capacitor 32 to the base of transistor 45.

Amplifier 44 includes a first transistor means such as PNP transistor 51 and a second transistor means such as PNP transistor 52. A common means such as the collectors of transistors 51 and 52 is connected to a common conductor. The collector of transistor 41, which comprises the output means of current control means 35, is connected to an input means of amplifier 44 such as an input means or base of transistor 51. An output means such as the emitter of transistor 51 is connected to an input means such as the base of transistor 52. An output means such as the emitter of transistor 52 is connected to the junction of resistor 47 and the emitter of transistor 46. A resistor 53 is connected from the junction between resistor 47 and capacitor 32 to the base of transistor 51.

The base of transistor 45 is connected to the base of transistor 51 by a potential reference means which consists of resistors 54 and 55 connected in series between the bases of transistors 45 and 51 and an NPN transistor 56. The junction between resistors 54 and 55 is connected to the base of transistor 56 which has a collector connected to the base of transistor 45 and an emitter connected to the base of transistor 51. A DC feedback means such as a resistor 57 is connected from the junction between resistor 47 and capacitor 32 to the junction between resistors 26 and 37.

The operation of the embodiment of FIG. 5 is substantially the same as the operation of the embodiment of FIG. 3. The utilization of complementary current amplifier 36 to amplify the difference current of constant current generator 34 and current control means 35 improves the efficiency of the circuit. Under quiescent conditions, constant current generator 34 and current control means 35 approximately equal currents flowing through transistors 21 and 41, respectively. Accordingly, the difference current is zero. The potential reference means provides a reference voltage between the bases of transistors 45 and 51 of approximately four times the base-to-emitter junction voltage of each of transistors 45, 46, 51, and 52, which is approximately 0.6 volt for each transistor when forward biased assuming typical silicon transistors are used. Under these conditions current amplifiers 43 and 44 are biased in a slightly conductive mode when the currents through transistors 21 and 41 are equal.

When an input signal of the waveform illustrated in FIG. 4A is applied at terminal 38, the current flow through transistor 41 is varied to provide a difference current resulting from the summation of the constant current from transistor 21 of constant current generator 34 with the current flowing through transistor 41.

When constant current generator 34 supplies more current than flows through current control means 35, the difference current is amplified by current amplifier 43 whereby the amplifier current flows from source 23 through transistor 46, resistor 47, capacitor 32, and winding 33 to ground. The current amplification factor or gain of current amplifier 43 is determined by the ratio of resistors 50 and 47, and it is substantially independent of the current gains of transistors 45 and 46. Assume that the resistance of resistor 47 is $R_1$ and the resistance of resistor 50 is $R_2$. Also assume that a difference current is flowing into the base of transistor 45 to forward bias transistors 45 and 46. Since a typical forward biased silicon transistor will have a base-to-emitter voltage of 0.6 volt, assume that the voltage from the base of transistor 45 to the emitter of transistor 46 is 1.2 volts. Thus, the voltage across resistors 47 and 50 is 1.2 volts.

Next assume that the difference current, $i_d$, increases by an incremental amount $\Delta i_d$. This current flows toward the base of transistor 45, however, very little of the increase of difference current, $\Delta i_d$, flows into the base of transistor 45. Substantially all of $\Delta i_d$ flows through resistor 50 to increase the voltage thereacross by approximately $\Delta v = R_2 \Delta i_d$. Since the voltage from the base of transistor 45 to the emitter of transistor 46 remains at approximately 1.2 volts, the voltage across resistor 47 must change also by $\Delta v = R_1 \Delta i_o$ where $i_o$ is the output current through resistor 47. Thus, the gain is $\Delta i_o / \Delta i_d = R_2/R_1$ or the ratio of resistor 50 to resistor 47.

When constant current generator 34 supplies less current than flows through current control means 35, the difference current is amplified by current amplifier 44 whereby the amplified current flows from winding 33 through capacitor 32, resistor 47, and transistor 52 to ground. The current amplification factor or gain of current amplifier 44 is determined by the ratio of resistors 53 and 47 in a manner analogous to the determination of the gain of current amplifier 43.

Feedback resistor 57 tends to stabilize constant current generator 34 and current control means 35 by providing DC negative feedback thereto. The negative feedback tends to balance the quiescent currents of transistors 21 and 41. If there is no input signal at terminal 38, the current through both transistors 21 and 41 should be approximately equal. If, for example, the current through transistor 21 is slightly larger than the current through transistor 41, transistor 21 tends to saturate which brings the voltage across winding 33 and capacitor 32 up. The feedback increases to decrease the bias at the base of transistor 21 and to increase the bias at the base of transistor 41 to thereby establish balance between transistors 21 and 41.

FIG. 6

The embodiment of FIG. 6 is a variation of FIG. 5 which illustrates some of the modifications which can be made within the scope of the invention. Constant current generator 34 remains substantially the same except that resistor 26 is connected in series with a resistor 60 from the base of transistor 21 to the common conductor. Current control means 35 includes two transistors illustrated as NPN transistors 61 and 62 connected in a Darlington configuration. Input terminal 38 is connected to the base of transistor 61, the emitter of which is connected to the base of transistor 62. The emitter of transistor 62 is connected by a resistor 63 to the common conductor. The collectors of transistors 61 and 62 are connected to the input of amplifier 44.

Amplifier 44 includes two transistors 64 and 65 connected in a quasi-PNP configuration. The collectors of transistors 61 and 62 are connected to the base of PNP transistor 64, the collector of which is connected to the base of NPN transistor 65. The emitter of transistor 65 is connected to the common conductor while the emitter of transistor 64 and the collector of transistor 65 are connected to resistor 47. Resistor 53 is connected between the base of transistor 64 and the junction of resistor 47 with capacitor 32.

Amplifier 43 includes two transistors 66 and 67 connected in a quasi-NPN configuration. The collector of transistor 21 is connected to the base of NPN transistor 66, the collector of which is connected to the base of PNP transistor 67. The emitter of transistor 67 is connected to source 23 while the emitter of transistor 66 and the collector of transistor 67 are connected to resistor 47. Resistor 50 is connected between the base of transistor 66 and the junction of resistor 47 with capacitor 32.

The potential reference means in FIG. 6 is diodes 70 and 71 series connected between the bases of transistors 66 and 64. The DC feedback for stabilizing constant current generator 34 is provided by a resistor 72 connected from the junction of amplifiers 43 and 44 with resistor 47 to the junction between resistors 26 and 60. This embodiment operates substantially the same as the embodiment of FIG. 5. The main differences are that the bias network of transistor 21 is not connected to the bias network of current control means 35. Current control means 35 utilizes a Darlington configuration instead of a single transistor, amplifiers 43 and 44 are modified, and the potential reference means is two series connected diodes.

FIG. 7

Figure 7:
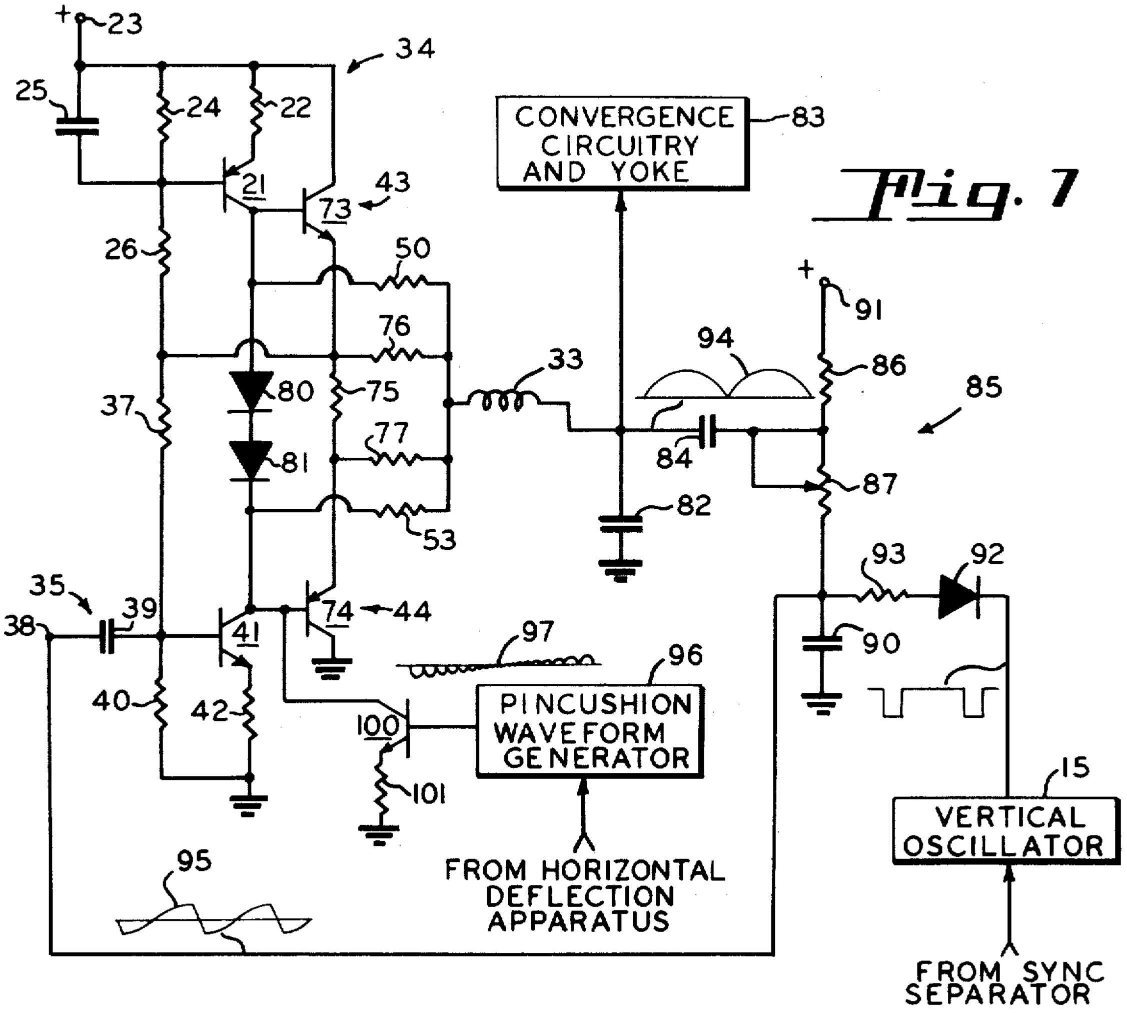
FIG. 7 is a schematic diagram of another embodiment of the invention which illustrates waveshaping circuitry for symmetrical "S" correction and pincushion correction.

The embodiment of FIG. 7 is another variation of FIG. 5 which additionally includes a waveform generator circuit and circuitry for providing symmetrical "S" correction and pincushion correction. Components that are the same as in FIG. 5 are numbered the same. Transistors 45 and 46 of FIG. 5 are replaced by a single NPN transistor 73 which has its collector connected to source 23 and its base connected to the collector of transistor 21. Transistors 51 and 52 of FIG. 5 are replaced by a single PNP transistor 74 which has its collector connected to the common conductor and its base connected to the collector of transistor 41. The emitter of transistor 73 is connected to the emitter of transistor 74 by a small current limiting resistor 75. The emitters of transistors 73 and 74 are connected to one end of winding 33 by resistors 76 and 77, respectively. Resistors 50 and 53 are connected from the junction of resistors 76 and 77 with winding 33 and the bases of transistors 73 and 74, respectively. The feedback resistor 57 of FIG. 5 is replaced by a direct connection from the emitter of transistor 73 to the junction of resistors 26 and 37. the potential reference means is replaced by diodes 80 and 81 series connected between the bases of transistors 73 and 74.

Coupling capacitor 32 of FIG. 5, is replaced by a coupling capacitor 82 which is connected between winding 33 and the common conductor. The waveform at the junction between winding 33 and capacitor 82 is a reasonable approximation of a parabolic waveform and can, therefore, be used for convergence of the electron beams in a color cathode ray tube. Accordingly, the junction between winding 33 and capacitor 82 is connected to convergence circuitry and convergence yoke apparatus 83. The convergence apparatus can be one of the types commonly in use in the prior art.

The junction between winding 33 and capacitor 82 is further connected by a coupling capacitor 84 to an integrating means 85. Integrating means 85 includes a series connected resistance means and capacitance means such as resistor 86, potentiometer 87, and capacitor 90 series connected between a source of energizing potential illustrated as a terminal 91 and a common conductor. Capacitor 84 is connected to the junction point between resistor 86 and potentiometer 87. The junction between potentiometer 87 and capacitor 90 is connected to input terminal 38. Vertical oscillator 15 is connected by a diode 92 in series with a resistor 93 to the junction between potentiometer 87 and capacitor 90. Vertical oscillator 15 may be any suitable oscillator means such as a multivibrator, for example.

In most present day television receivers the electron beam does not scan uniformly across the screen of the cathode ray tube when a linear sawtooth deflection current is applied to the vertical deflection winding. Specifically, the radius of the picture tube screen curvature is longer than the radius of the deflected electron beam curvature thereby causing the displayed image to be expanded or larger at the top and bottom than at the center. A type of correction called S-correction herein is used to decrease the rate of scanning at the top and bottom of the screen to correct for this curvature difference between the cathode ray tube screen and the deflected electron beams. Integrating means 85 is designed to provide an S-corrected deflection waveform.

Assuming that the output voltage from oscillator 15 is sufficiently positive to reverse bias diode 92, capacitor 90 charges through resistor 86 and potentiometer 87. The generally parabolic waveform 94 is coupled to potentiometer 87 to vary the rate of charging of capacitor 90 in accordance with the voltage across capacitor 82. Since the voltage across capacitor 82 is indicative of the position of the electron beam in the cathode ray tube, the rate of charging of capacitor 90 is varied in accordance with the position of the electron beam. The voltage across capacitor 90 is coupled through capacitor 39 to current control means 35. This voltage is illustrated by waveform 95 which is a linear sawtooth with an S-correction component superimposed thereon. Potentiometer 87 is provided for varying the rate of charging of capacitor 90.

When oscillator 15 provides a negative-going pulse, diode 92 is forward biased and capacitor 90 discharges therethrough to cause the voltage at the base of transistor 41 to decrease thereby causing a retrace current to be applied to winding 33. The retrace current causes the electron beam of the cathode ray tube to return to its initial point on the screen.

Integrating means 85 is called an integrating means because it integrates the voltage represented by parabolic waveform 94 to provide the S-correction component of waveform 95. When capacitor 90 is charged and discharged, a sawtooth waveform voltage is generated thereacross. The voltage across capacitor 82 (parabolic waveform 94) is utilized to vary the rate of charging of capacitor 90 with the result that the parabolic voltage is integrated to provide an S-correction voltage component superimposed on the sawtooth voltage across capacitor 90.

Also, in FIG. 7, pincushion correction circuitry is illustrated. A pincushion waveform generator 96 receives a signal from the horizontal deflection apparatus and provides a pincushion correction signal 97 which can be in accordance with one of the various known methods. Signal 97 is coupled to the base of a transistor 100, the emitter of which is connected to a common conductor by a resistor 101. The collector of transistor 100 is connected to the base of transistor 74 where waveforms 95 and 97 are added. The pincushion correction signal could alternatively be applied at other points in the circuit, for example, the base of transistor 73 with an opposite polarity waveform 97. In view of the above description of FIG. 7, it is to be understood that the term sawtooth waveform or signal includes the various corrected versions thereof.

FIG. 8

Figure 8:
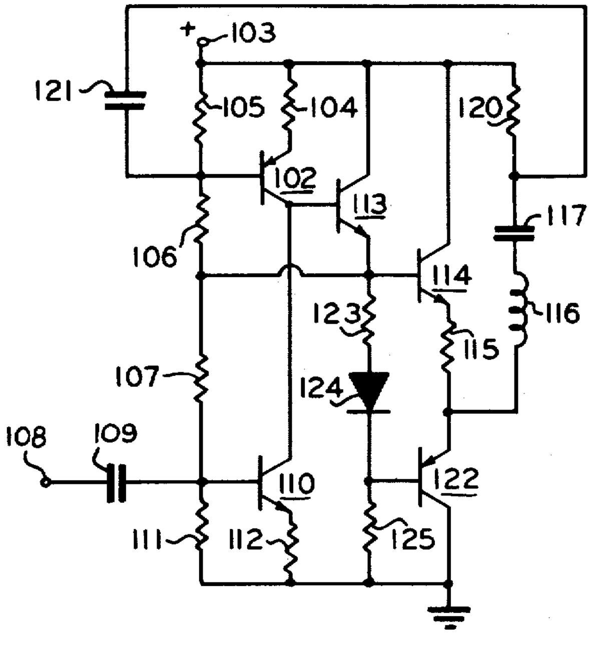
FIG. 8 is a schematic diagram of another embodiment which utilizes a negative current feedback.

In FIG. 8 a modified form of the invention is illustrated. The constant current generator includes a transistor 102 and a source of energizing potential 103. Source 103 is connected by a resistor 104 to the emitter and by a resistor 105 to the base of transistor 102. The base of transistor 102 is connected by a resistor 106 in series with resistor 107 to the base of a current control transistor 110. An input terminal 108 is connected by a coupling capacitor 109 to the base of transistor 110. The base of transistor 110 is connected by a resistor 111 to a common conductor and the emitter is connected by a resistor 112 to the common conductor. The collectors of transistors 102 and 110 are connected to the base of a transistor 113, the collector of which is connected to source 103. The emitter of transistor 113 is connected to the base of a transistor 114, the collector of which is connected to source 103. The emitter of transistor 114 is connected by a small current limiting resistor 115 to one end of a deflection winding 116, the other end of which is connected by a capacitor 117 in series with a small current limiting resistor 120 to source 103. The junction between capacitor 117 and resistor 120 is coupled by a negative current feedback means illustrated as a capacitor 121 to the base of transistor 102. The junction of resistor 115 and winding 116 is connected to the emitter of a transistor 122, the collector of which is connected to the common conductor. The base of transistor 114 is connected to the base of transistor 122 by a potential reference means in the form of a series connected resistor 123 and diode 124. The base of transistor 122 is connected to the common conductor by a resistor 125. The emitter of transistor 113 is connected to the junction between resistors 106 and 107 to provide DC feedback to the constant current generator and current control transistors 102 and 110.

The operation of the embodiment of FIG. 8 is similar to the operation of the other embodiments. The difference current is amplified by transistor 113 which drives transistors 114 and 122 to apply a sawtooth current to winding 116. Capacitor 121 provides AC negative current feedback to compensate for nonlinearities in the current through winding 116, since resistor 120 monitors all the current flowing through winding 116. The input signal amplified by transistor 110 and the negative current feedback signal amplified by transistor 102 are added at the junction of the collectors of transistors 102 and 110. The difference signal is applied to the base of transistor 113, and further amplified by transistors 114 and 122. Resistor 115 has a small resistance, under 1 ohm, to prevent thermal runaway of transistors 114 and 122.

Thus, the invention illustrated and described provides a current drive transformerless deflection system with numerous advantages. For example, the use of current drive circuitry in accordance with the invention enables the designer to provide one circuit design for a large number of deflection yoke and winding designs with a wide variation in inductance to resistance ratio. Since a large variation in inductance to resistance ratio does not substantially affect the amount of current that flows through the deflection winding, the temperature compensating thermistor required in prior art systems is not necessary. Also, a linearity control to compensate for production variables that affect the inductance to resistance ratio is not required. Furthermore, since the system is a current drive system, the coupling capacitor used to couple the drive circuit to the winding can be much smaller, e.g., an order of magnitude smaller. Also, means are provided for S-correction and for providing a parabolic source for convergence.

While numerous embodiments of the invention have been shown and described, many of the features shown in one of the embodiments can be incorporated in the other embodiments as well. Accordingly, while there has been shown and described what is at present considered the preferred embodiments of the invention, it will be obvious to those skilled in the art that various changes and modifications may be made therein within the scope of the appended claims.

I claim:

1. Apparatus for deflecting an electron beam in a cathode ray tube comprising:

a deflection winding;

means for providing a constant current;

current control means;

current amplifier means connected to said means for providing a constant current, to said current control means, and to said winding for providing a current to said winding in response to the difference of the current flowing through said current control means and the constant current from said means for providing a constant current; and means connected to said current control means for varying the conduction of said current control means to apply a current of predetermined waveform to said winding.

2. Apparatus as defined in claim 1 wherein said current amplifier means includes: a first amplifier having an input means connected to said means for providing a constant current and to said current control means and an output means connected in circuit with said winding; and a second amplifier having an input means connected to said current control means and to said means for providing a constant current and an output means connected in circuit with said winding.

3. Apparatus as defined in claim 2 wherein said first amplifier includes a first transistor and a second transistor each having input means and output means, said input means of said first transistor comprising the input means of said first amplifier, said output means of said second transistor being connected to the output means of said first amplifier, and said output means of said first transistor being connected to said input means of said second transistor, and wherein said second amplifier includes a third transistor and a fourth transistor each having input means and output means, said input means of said third transistor comprising the input means of said second amplifier, said output means of said fourth transistor being connected to the output means of said second amplifier, and said output means of said third transistor being connected to said input means of said fourth transistor.

4. Apparatus as defined in claim 2 wherein said first and second amplifiers each include resistance means connected from the input means to the output means thereof for controlling the gains of said first and second amplifiers.

5. Apparatus as defined in claim 2 wherein said current amplifier means includes potential reference means connected between the input means of said first amplifier and the input means of said second amplifier.

6. Apparatus as defined in claim 1 including direct current feedback means connected between said current amplifier means and said means for providing a constant current for stabilizing said means for providing a constant current.

7. Apparatus as defined in claim 1 including feedback means connected in circuit with said winding and further connected to said means for providing a constant current for providing alternating feedback to compensate for non-linearities of the current through said winding.

8. Apparatus as defined in claim 1 including means for generating a pincushion correction signal connected to said current amplifier means, said current amplifier means combining the pincushion correction signal with the current of a predetermined waveform.

9. Apparatus as defined by claim 1 wherein said means for varying the conduction of said current control means includes: oscillator means for providing signals at the sweep rate of the cathode ray tube; integrating means; means connecting said winding to said integrating means; means connecting said oscillator means to said integrating means; and means connecting said integrating means to said current control means.

10. Apparatus as defined in claim 9 wherein said integrating means includes a series connected resistance means and capacitance means, said winding being connected in series with a capacitor with the junction between said winding and said capacitor being connected to said resistance means, said oscillator means being connected to a junction between said resistance means and said capacitance means whereby pulses provided by said oscillator means periodically discharge said capacitance means, and a junction between said resistance means and said capacitance means is connected to said current control means.

11. In a television receiver including a cathode ray tube, apparatus for deflecting an electron beam in the cathode ray tube comprising:

a deflection winding;

first transistor means biased for generating a constant current;

second transistor means;

a complementary current amplifier connected between said first transistor means, said second transistor means, and said deflection winding for amplifying the difference of the currents flowing through said first and second transistors and applying the amplified difference current to said deflection winding; and means connected to said second transistor means for providing a sawtooth signal thereto whereby the conduction of said second transistor means is varied to vary the amount of current flowing through said deflection winding.

12. Apparatus as defined in claim 11 wherein said means for providing a sawtooth signal includes: an integrating means connected to said deflection winding for receiving a parabolic signal therefrom; an oscillator means connected to said integrating means for providing reset signals thereto; and means connecting said integrating means to said second transistor means for providing the sawtooth signal thereto.

13. Apparatus as defined in claim 12 wherein said integrating means includes a resistance means and a capacitance means connected in series with a source of energizing potential.

14. Apparatus as defined in claim 11 wherein a direct current feedback means is connected between an output of said complementary current amplifier and said first transistor means for stabilizing the constant current provided by said first transistor means, and a potential reference means is connected between said first and second transistor means for stabilizing the voltage therebetween.

15. Apparatus as defined in claim 11 including convergence apparatus connected to said deflection winding for receiving a parabolic waveform therefrom.

16. Apparatus as defined in claim 11 including feedback means connected in circuit with said winding and further connected to said first transistor means for providing alternating feedback to compensate for nonlinearities of the current through said winding.

17. Apparatus as defined in claim 16 wherein said feedback means includes a capacitor.

* * * * *